US008746710B2

(12) United States Patent
Schejbal

(10) Patent No.: US 8,746,710 B2
(45) Date of Patent: Jun. 10, 2014

(54) PATIENT SUPPORT APPARATUS HAVING AN AUXILIARY WHEEL

(75) Inventor: Ladislav Schejbal, Kladno (CZ)

(73) Assignee: Linet Spol s.r.o., Slany (CZ)

( * ) Notice: Subject to any disclaimer, the term of this patent is extended or adjusted under 35 U.S.C. 154(b) by 867 days.

(21) Appl. No.: 12/781,625

(22) Filed: May 17, 2010

(65) Prior Publication Data

US 2011/0277241 A1 Nov. 17, 2011

(51) Int. Cl.
*B62D 61/12* (2006.01)

(52) U.S. Cl.
USPC .................. 280/43.23; 280/43; 5/510; 5/86.1

(58) Field of Classification Search
USPC ........... 280/43, 43.17, 43.2, 43.23; 16/19, 29, 16/32, 33, 34; 5/86.1, 600, 620, 658, 510, 5/511
See application file for complete search history.

(56) References Cited

U.S. PATENT DOCUMENTS

| | | | | |
|---|---|---|---|---|
| 2,599,717 | A * | 6/1952 | Menzies | 5/510 |
| 3,305,876 | A * | 2/1967 | Hutt | 5/11 |
| 7,419,019 | B1 * | 9/2008 | White et al. | 180/19.3 |
| 7,530,412 | B2 * | 5/2009 | Heimbrock et al. | 180/65.1 |
| 8,109,525 | B2 * | 2/2012 | Salus | 280/43 |
| 8,122,535 | B2 * | 2/2012 | Hensley et al. | 5/86.1 |

* cited by examiner

*Primary Examiner* — John Walters
(74) *Attorney, Agent, or Firm* — Thedford I. Hitaffer; Hitaffer & Hitaffer, PLLC

(57) ABSTRACT

A patient support has caster devices supporting a frame for movement in relation to a supporting surface. A lift supports an auxiliary wheel in relation to the frame. A shaft may be rotatable to drive the lift to move the auxiliary wheel between a deployed position and a retracted position. The shaft may rotate to control deployment and retraction of the auxiliary wheel. A sensor may control deployment and retraction of the auxiliary wheel. An element may provide a dampening effect when the auxiliary wheel encounters a raised surface and urge the auxiliary wheel into contact with the supporting surface when the auxiliary wheel encounters a lowered surface.

8 Claims, 11 Drawing Sheets

PATIENT SUPPORT APPARATUS HAVING AN AUXILIARY WHEEL

BACKGROUND OF THE INVENTION

This invention relates in general to beds and more particularly to patient support apparatus, including healthcare facility beds, having a wheel that can be deployed to contact a floor along which the patient support apparatus is being guided.

There is a continuing effort to improve the steering (e.g., tracking and maneuverability) of patient support apparatus (i.e., hospital beds, stretchers, and the like). Typically, such apparatus generally comprise castors (i.e., pivoting or swiveling wheels) located at four corners of the apparatus. Such apparatus are difficult to handle along straight paths because the axes of the castors are not maintained in a fixed relationship or orientation. Since the apparatus will tend to move in the direction of the rotation of a wheel, if the castors are pointed in different directions, the apparatus will be pulled in those respective directions, and therefore the apparatus will not have any fixed and predictable direction of motion. Additionally, it is difficult to steer or maneuver an apparatus on castors around corners because there is no fixed pivot axis for turning the apparatus. As a consequence, the person steering the apparatus must, through significant effort, force the apparatus to turn as desired. It is desirable that an operator be able to establish and maintain the path of motion of the apparatus.

To facilitate handling, the apparatus may include mechanisms to selectively brake one or more castors or to lock castors in a desired position after they have been manually adjusted to that position. Generally, because of the unpredictability of motion and the physical effort required to maneuver patient support apparatus, two people are often required to steer the apparatus.

In order to improve the tracking or maneuverability (e.g., the tendency of the apparatus to maintain an existing path of motion absent an operator force intended to cause the apparatus to deviate from the existing path of motion), it is known to deploy one or more additional wheels. For example, a deployable fixed axis auxiliary wheel may be located at the midpoint or center of the apparatus. This helps overcome the tendency of the apparatus to drift sideways while the apparatus is moved.

SUMMARY OF THE INVENTION

This invention relates to a patient support comprising a plurality of caster devices supporting a frame for movement in relation to a supporting surface. A lift supports an auxiliary wheel for movement about an axis of rotation in relation to the frame within an area bound by the caster devices. The patient support may comprise a shaft that is rotatable about an axis of rotation to drive the lift to move the auxiliary wheel in relation to the frame between a deployed position contacting the supporting surface and a retracted position spaced from the supporting surface. A device may count rotations of the shaft to control deployment and retraction of the auxiliary wheel by the lift. The patient support may further comprise an actuator configured to drive the lift to move the auxiliary wheel in relation to the frame between the deployed position and the retracted position. A sensor may control deployment and retraction of the auxiliary wheel. An element may provide a dampening effect when the auxiliary wheel encounters a raised surface and urge the auxiliary wheel into contact with the supporting surface when the auxiliary wheel encounters a lowered surface.

Various advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
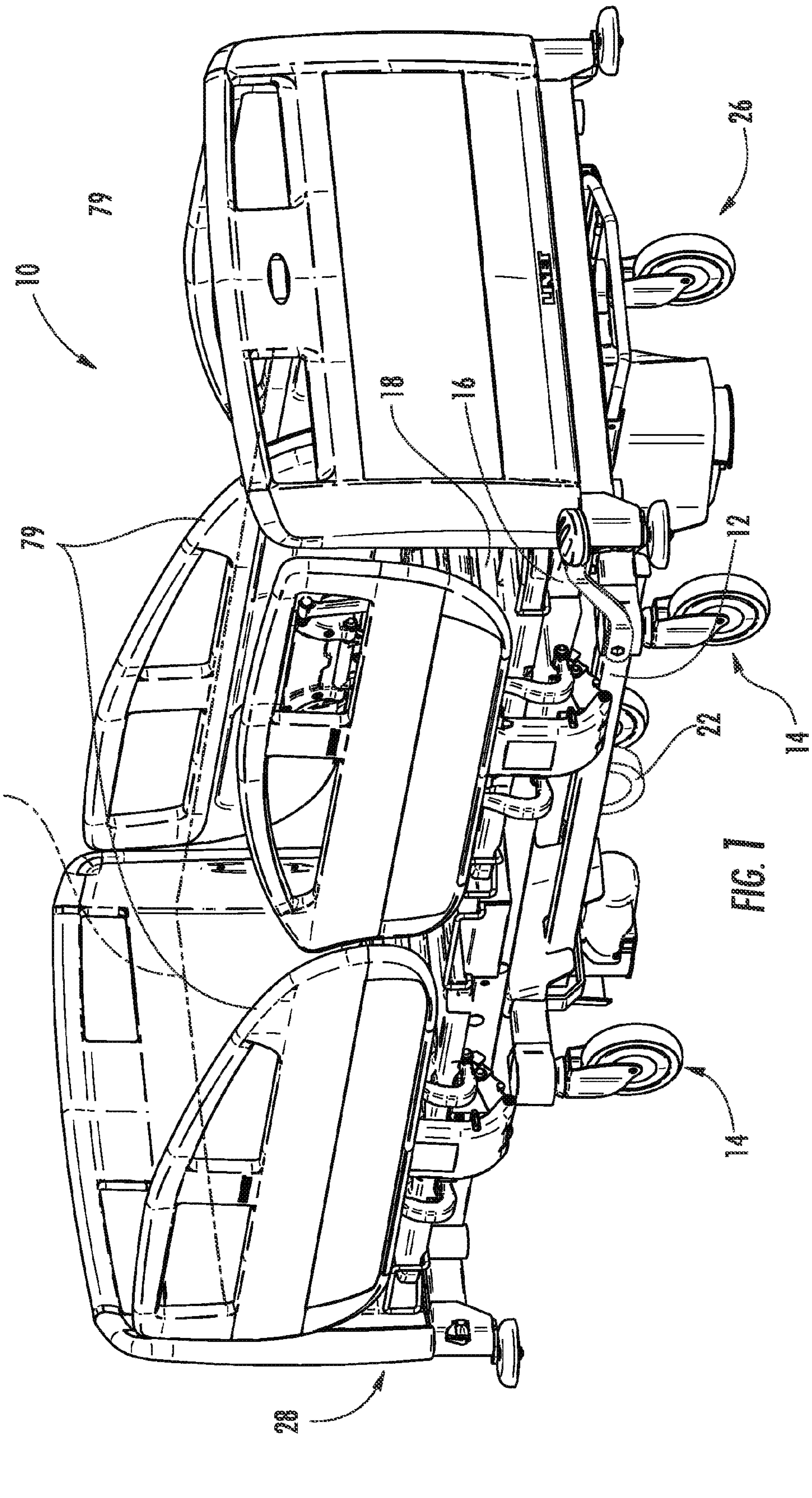
FIG. 1 is a side perspective view of an exemplary patient support apparatus with an auxiliary wheel.

Referring now to the drawings, there is illustrated in FIG. 1 a patient support apparatus (i.e., hospital beds, stretchers, and the like) for use in healthcare facilities. The apparatus is hereinafter referred to as a bed 10. The bed 10 includes a base frame 12 supported for movement in relation to a supporting surface, such as the floor, by caster devices 14. An intermediate frame 16 is supported for vertical movement in relation to the base frame 12 by longitudinally spaced lift mechanisms, which may be in the form of telescopic columns. An articulated deck 18 has deck sections that are mounted for pivotal movement in relation to the intermediate frame 16.

The articulated deck 18 defines a supporting surface for a mattress 20, which in turn defines a patient support surface.

To improve the tracking or maneuverability of the bed 10, an auxiliary wheel 22 is located proximate the midpoint or center of the bed 10. Illustratively, the auxiliary wheel 22 is a not a caster wheel (i.e., a wheel that is supported to swivel and rotate), although the auxiliary wheel 22 may be a caster wheel, and may be provided with a caster brake (e.g., to prevent rotation of the wheel) and/or a steering lock (e.g., to prevent swivel movement of the wheel).

The exemplary auxiliary wheel 22 is mounted in relation to the base frame 12. Although other locations may be suitable, the illustrated auxiliary wheel 22, when deployed, is located within two inches (5 cm) from the midpoint or at the lateral and longitudinal center of the base frame 12 (e.g., spaced substantially equidistantly from each end 26, 28 of the bed 10). It should be appreciated that the auxiliary fifth wheel 22 is supported so that when retracted, it is substantially not visible beneath the base frame 12.

Figure 2:
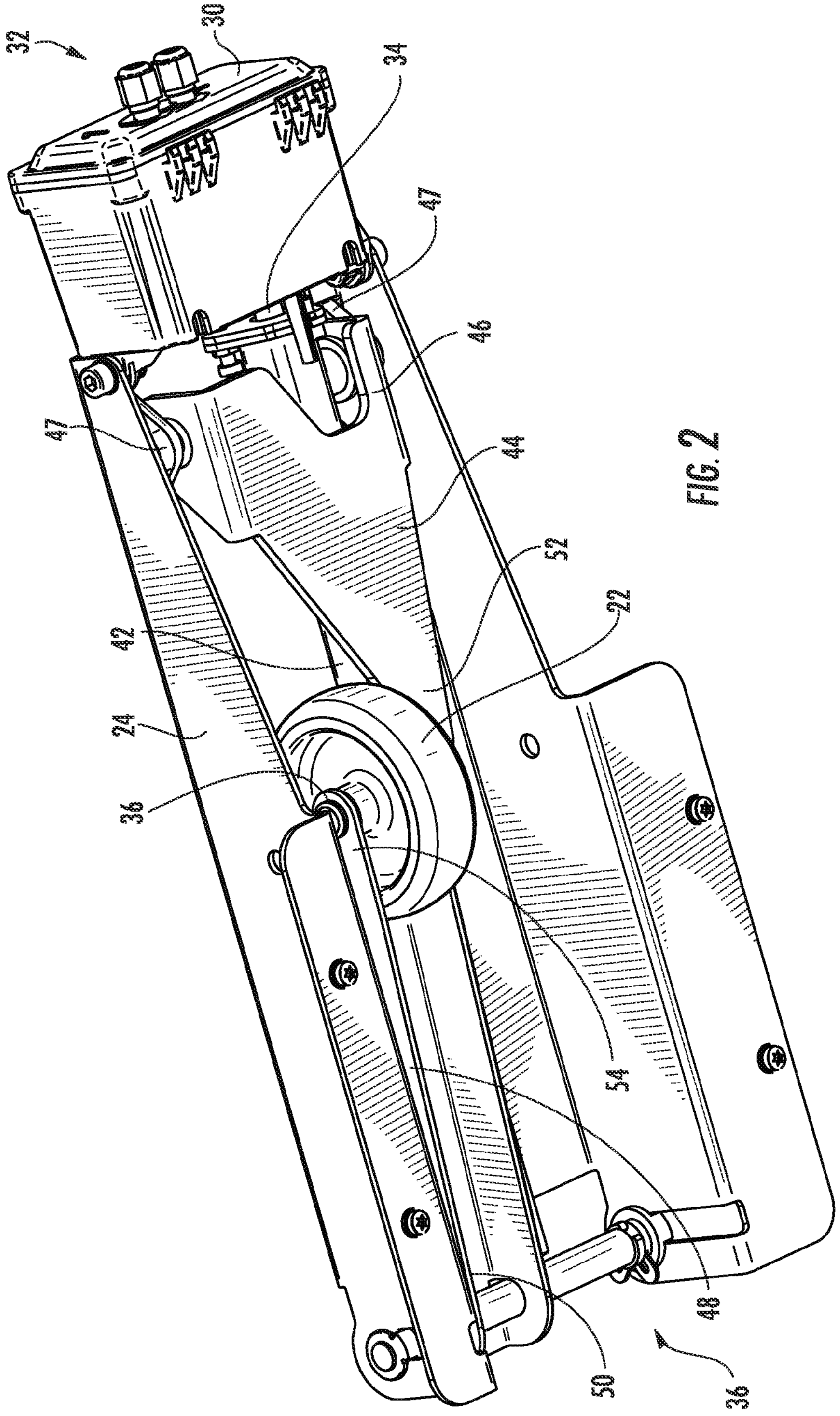
FIG. 2 is a bottom perspective view of an exemplary auxiliary wheel assembly with an auxiliary wheel retracted.
Figure 3:
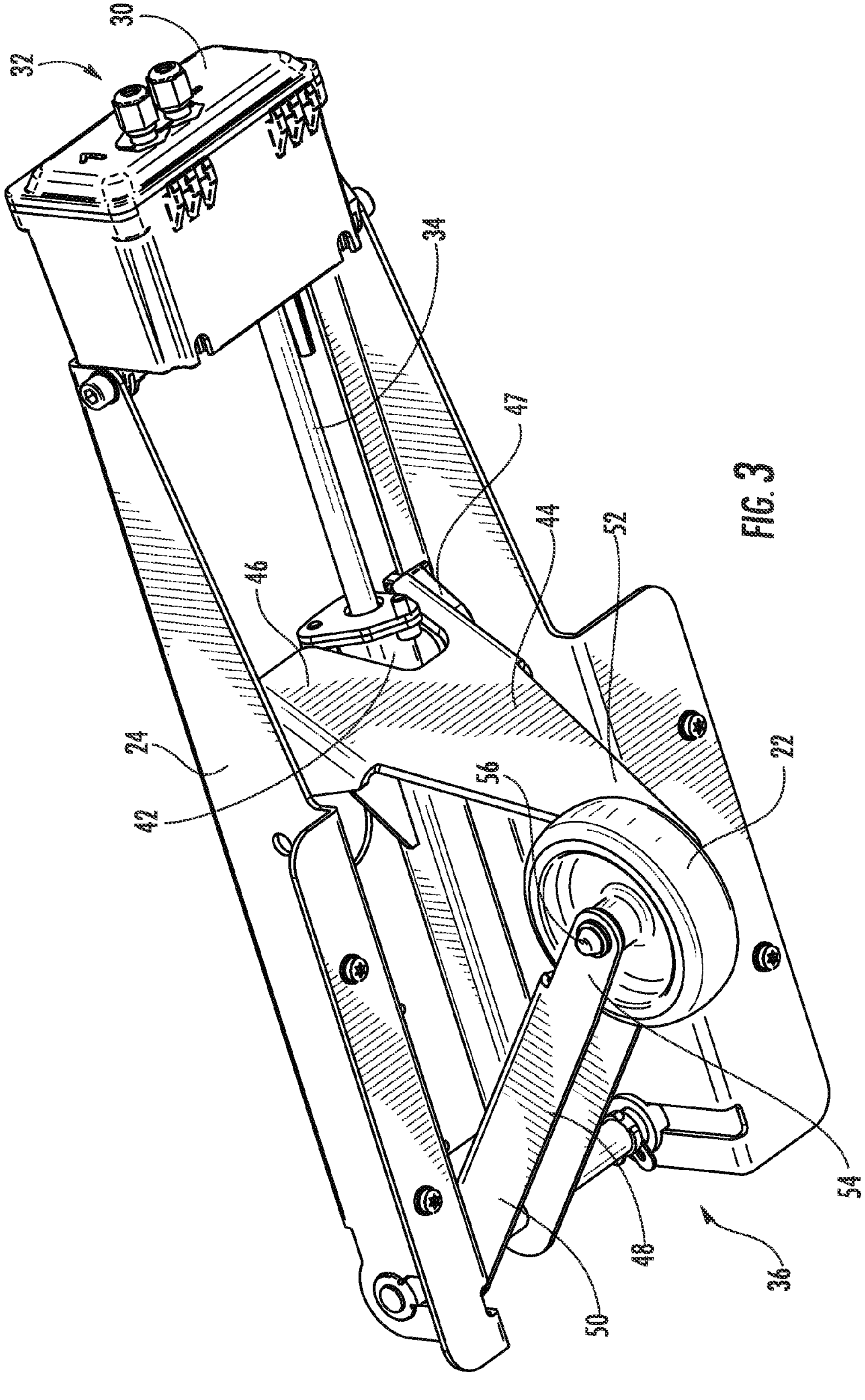
FIG. 3 is a bottom perspective view of the auxiliary wheel assembly shown in FIG. 2 with the auxiliary wheel deployed.
Figure 4:
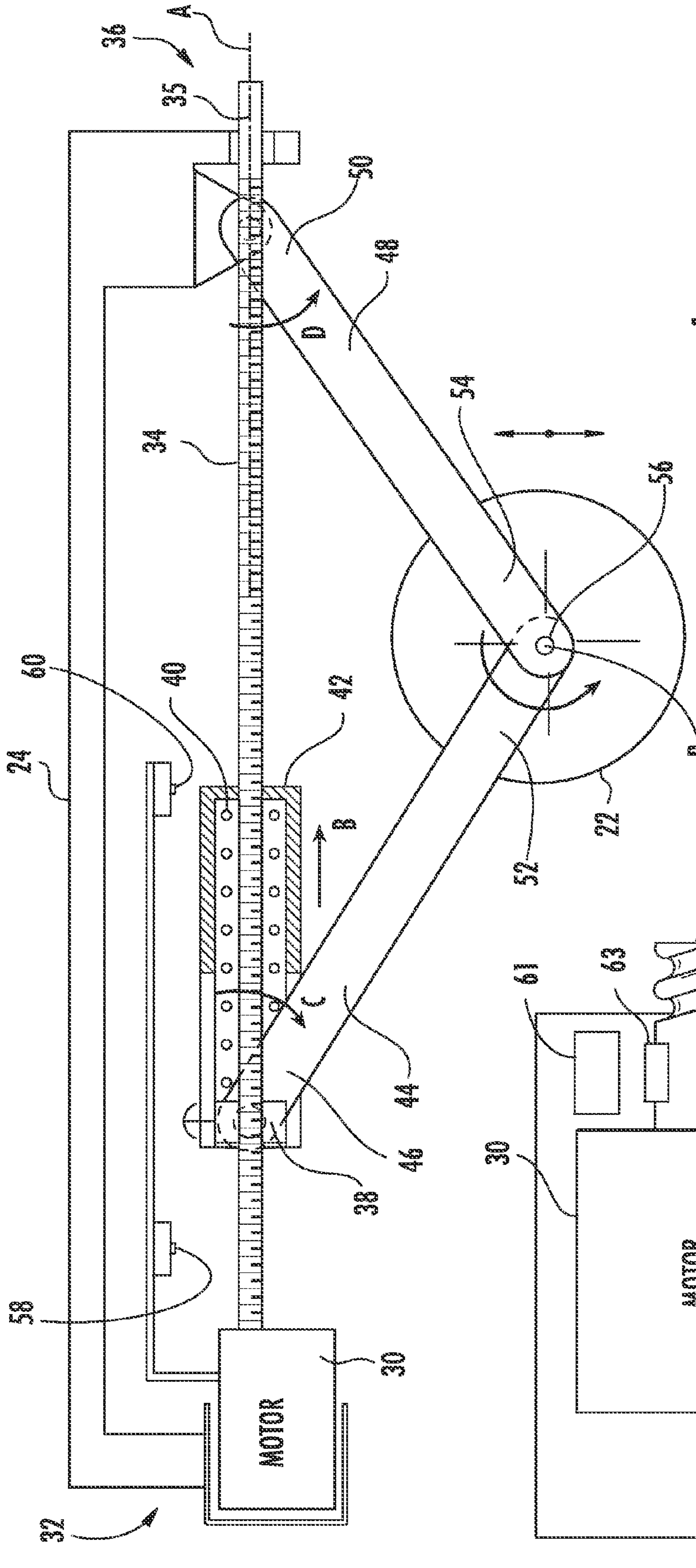
FIG. 4 is a diagrammatic representation of the exemplary auxiliary wheel assembly shown in FIG. 2.

Although the auxiliary wheel 22 may be mounted in relation to the base frame in any suitable manner, the exemplary auxiliary wheel 22 is supported in relation to an auxiliary wheel assembly, which may include a girder 24, as shown in FIGS. 2-4, which is mounted to the base frame 12 of the bed 10. As will become more apparent in the description below, the auxiliary wheel 22 may be movable between a first deployed position, wherein the auxiliary wheel 22 is lowered into contact with the supporting surface, and a second retracted position, wherein the auxiliary wheel 22 is raised away from the floor, and stowed within or substantially within the girder 24 so that the auxiliary fifth wheel 22 is not or substantially not visible beneath the base frame 12. When deployed, the auxiliary wheel 22 may allow a person to have better control over movement of the bed 10.

The auxiliary wheel 22 may be deployed and retracted in any suitable manner and by operation of any suitable prime mover. For example, a drive motor 30 is illustrated in FIGS. 2 and 3. The drive motor 30 may be attached in relation to a first end 32 of the girder 24 (i.e., to the left when viewing FIG. 4). A drive screw 34 may be driven by the drive motor 30. The drive screw 34 may extend from the motor 30, and may be axially fixed for rotational movement in relation to the girder 24. For example, a free end 35 of the drive screw 34 may be cantilevered (as shown in FIG. 2) or fixed for rotational movement to a second end 36 of the girder 24 (i.e., to the right when viewing FIG. 4). A drive nut 38 (shown in FIG. 4) may be supported for axial movement along the drive screw 34 as the drive screw 34 rotates by operation of the drive motor 30. The drive nut 38 may be captured, together with a helical spring 40 (shown in FIG. 4), within a capsule 42. The exemplary drive nut 38 is rotationally fixed for axial movement along a longitudinal axis A (shown in FIG. 4) within the capsule 42. A first bracket 44 may have an upper end 46 that is pivotally connected in relation to a first end of the capsule 42 (i.e., the left end when viewing FIG. 4). Additionally, the upper end 46 of the first bracket 44 may be slidably and pivotally connected in relation to laterally sides of the girder 24 via slide blocks 47 (shown in FIGS. 2 and 3). A second bracket 48 may have an upper end 50 that may be pivotally connected to the second end 36 of the girder 24. Lower ends 52, 54 of the first and second brackets 44, 48 may be pivotally connected together at pivot axis P (shown in FIG. 4). The auxiliary wheel 22 may be supported for rotation about a wheel axle 56 concentric with the pivot axis P in relation to the lower ends 52, 54 of the brackets 44, 48.

Control of the drive motor 30 and deployment of the auxiliary wheel 22 may be accomplished in any suitable manner. For example, one or more controls 57 (see FIG. 9) for operating the drive motor 30 may include one or more foot pedals. For example, a three position pedal may be operated to a first position, wherein the caster devices 14 are braked, a second position, wherein the caster devices 14 are unbraked, and third position, wherein the auxiliary wheel 22 is deployed. It should be appreciated that the controls 57 may alternatively, or additionally, be in the form of hand controls (not shown).

Deployment of the auxiliary wheel 22 may be limited so as to not raise the base frame 12 out of contact with the supporting surface. This may be accomplished in any suitable manner. For example, the travel of capsule 42 may be limited, for example, with the use of control device, such as sensors (e.g., photo cells and LEDs) or switches, such as the micro switches 58, 60 illustratively shown, which may provide signals when the capsule 42 reaches the desired limits. One micro switch 58 may limit the travel of the capsule 42 to limit the travel of the auxiliary wheel 22 to the retracted position (shown in FIG. 2), wherein the auxiliary wheel 22 is stowed within or substantially within the girder 24 so that the auxiliary fifth wheel 22 is not or substantially not visible beneath the base frame 12. The other micro switch 60 may limit the travel of the capsule 42 to limit the travel of the auxiliary wheel 22 to the deployed position (shown in FIGS. 3 and 4), wherein the auxiliary wheel 22 is lowered into contact with the supporting surface.

Alternatively, a number of rotations of the drive screw 34 may correctly position the capsule 42, which may correspond to the correct position of the auxiliary wheel 22. This may be accomplished by use of a Hall-Effect device 61 (shown in FIG. 5), or other suitable device (e.g., a shaft encoder), which may be used to count the number of shaft rotations. For example, the operation of the drive motor 30, and thus the travel of the capsule 42, may be controlled by a counter. The counter may register rotations of the drive screw 34, which may correlate to the travel of the capsule 42 and the deployment and retraction of the auxiliary wheel 22. A Hall-Effect device 61 may count the rotations of the drive screw 34 (e.g., by counting the rotations of permanent magnet 63 affixed to the redial surface of the drive screw 34 or affixed to a rotary plate supported for rotation with the drive screw 34). The drive screw 34 can be operated to rotate a predetermined number of rotations to move the auxiliary wheel 22 into engagement with the supporting surface. Given parameters and/or specifications, for example, of the bed 10, the drive screw 34, the capsule 42, the brackets 44, 48, and the auxiliary wheel 22, the drive motor 30 may stop driving the screw 34 after the predetermined number of rotations, at which point the auxiliary wheel 22 is engaged with the supporting surface.

Figure 5:
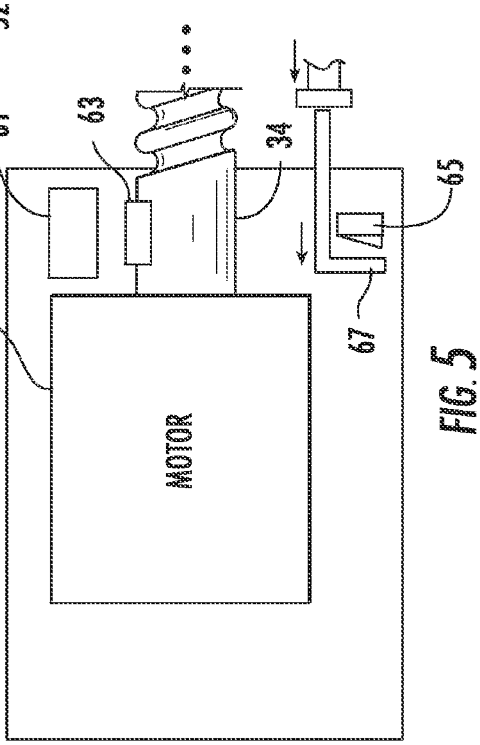
FIG. 5 is a diagrammatic representation of exemplary control devices.

It should be appreciated that the Hall-Effect device 61 may erroneously count (e.g., over-count or under-count) shaft rotations over a number of operating cycles of the auxiliary wheel assembly. As a consequence, it may be desirable to reset the counter with each operation of the auxiliary wheel assembly. This may be done in any suitable manner. For example, a control device (e.g., micro switch) may reset the counter. The micro switch 65 may be normally closed, for example, by a spring-biased push rod 67. When the auxiliary wheel 22 is retracted, the first bracket 44 may contact and displace the push rod 67 (i.e., to the left when viewing FIG. 5), allowing the micro switch 65 to open (i.e., as shown in FIG. 5). This state (i.e., the open state) of the micro switch 65 may cause the counter to reset. It should be understood that the micro switch 65 may be an open switch that may be closed (i.e., in a closed state) by displacement of the push rod 67 to reset the counter.

The operation of the auxiliary wheel 22 may be best understood with continued reference to FIG. 4. As the drive motor 30 is driven, the drive screw 34 rotates, which in turn drives the drive nut 38. The drive nut 38 moves along axis A (i.e., in the direction of arrow B when viewing FIG. 4). This causes the upper end 46 of the first bracket 44 to move toward the second end 36 of the girder 24 (i.e., to the right when viewing the drawing). The lower end 52 of the first bracket 44 moves downward and toward the second end 36 of the girder 24. The first bracket 44 pivots in clockwise direction in relation to the drive nut 38 (i.e., along the line C in the drawing). At the same time, the second bracket 48 pivots in counter clockwise direction in relation to the girder 24 (i.e., along the line D in the drawing). The auxiliary wheel 34 lowers to the deployed position in contact with the supporting surface.

Figures 6A, 6B, 6C:
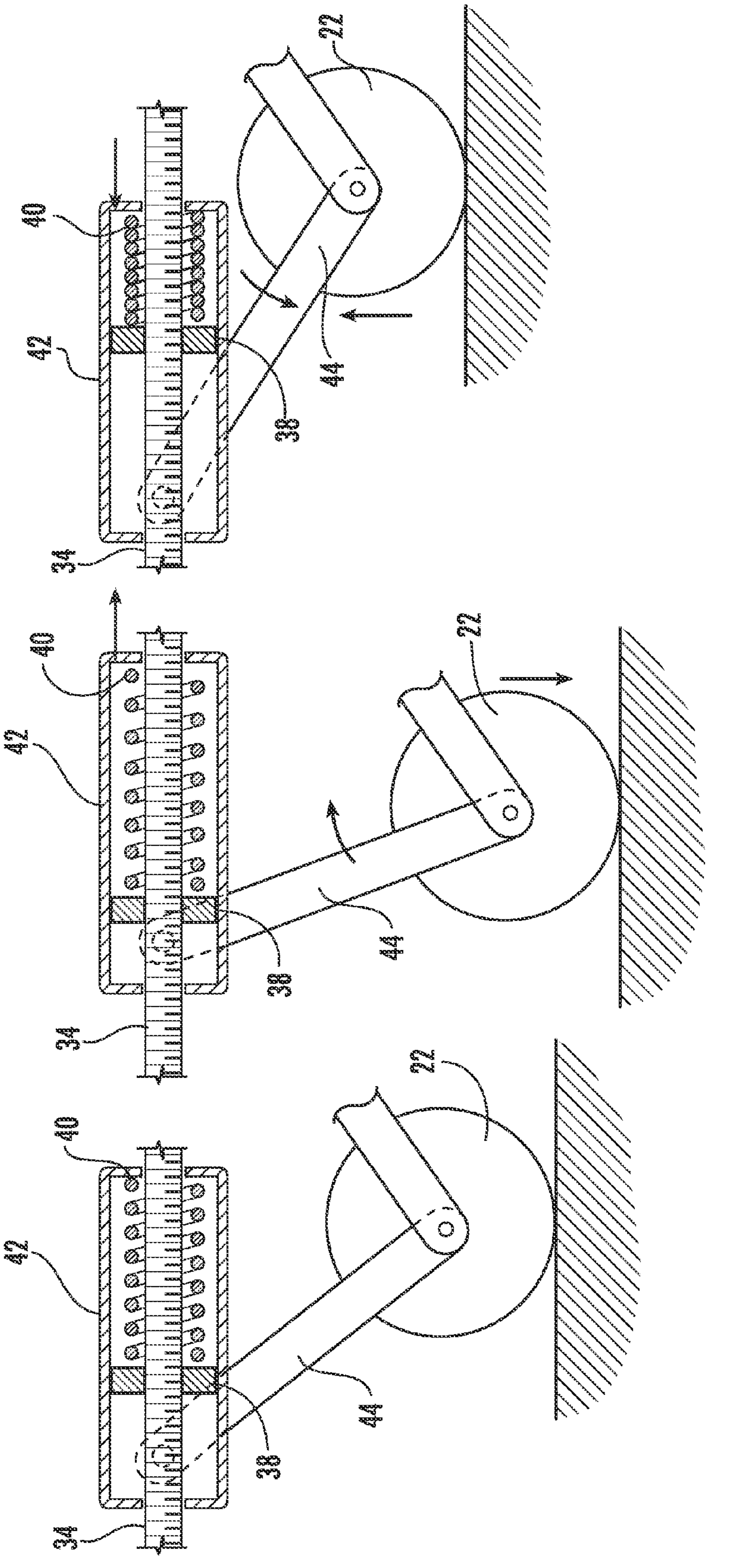
FIG. 6A is a schematic representation of the auxiliary wheel engaging a supporting surface.
FIG. 6B is a schematic representation of the auxiliary wheel engaging a dip in the supporting surface.
FIG. 6C is a schematic representation of the auxiliary wheel engaging a bump supporting surface.

Illustratively, the helical spring 40 within the capsule 42 is in compression when the auxiliary wheel 22 is deployed, as shown in FIG. 6A. When the auxiliary wheel 22 encounters a dip (i.e., a low area in the supporting surface), the helical spring 40 within the capsule 42 decompresses, as shown in FIG. 6B. This urges the capsule 42 to move in relation to the drive screw 34 and the drive nut 38 (i.e., to the right when viewing FIG. 6B). This, in turn, urges first bracket 44 to move in relation to the girder 24 (to the right when viewing the drawing), which urges the auxiliary wheel 22 to move down into the dip, thus causing the auxiliary wheel 22 to maintain contact with the supporting surface.

Conversely, when the auxiliary wheel 22 encounters a bump or a raised area of the supporting surface, the auxiliary wheel 22 raises, urging the first bracket 44 to move in relation to the girder 24 (to the left when viewing FIG. 6C). The capsule 42 is urged to move in relation to the drive screw 34 and the drive nut 38 (to the left when viewing the FIG. 6C). This further compresses the helical spring 40 within the capsule 42, which dampens the movement of the first bracket 44. Hence, the spring 40 may function as a dampening spring to provide a resilient suspension for the fifth wheel 22.

Figure 7:
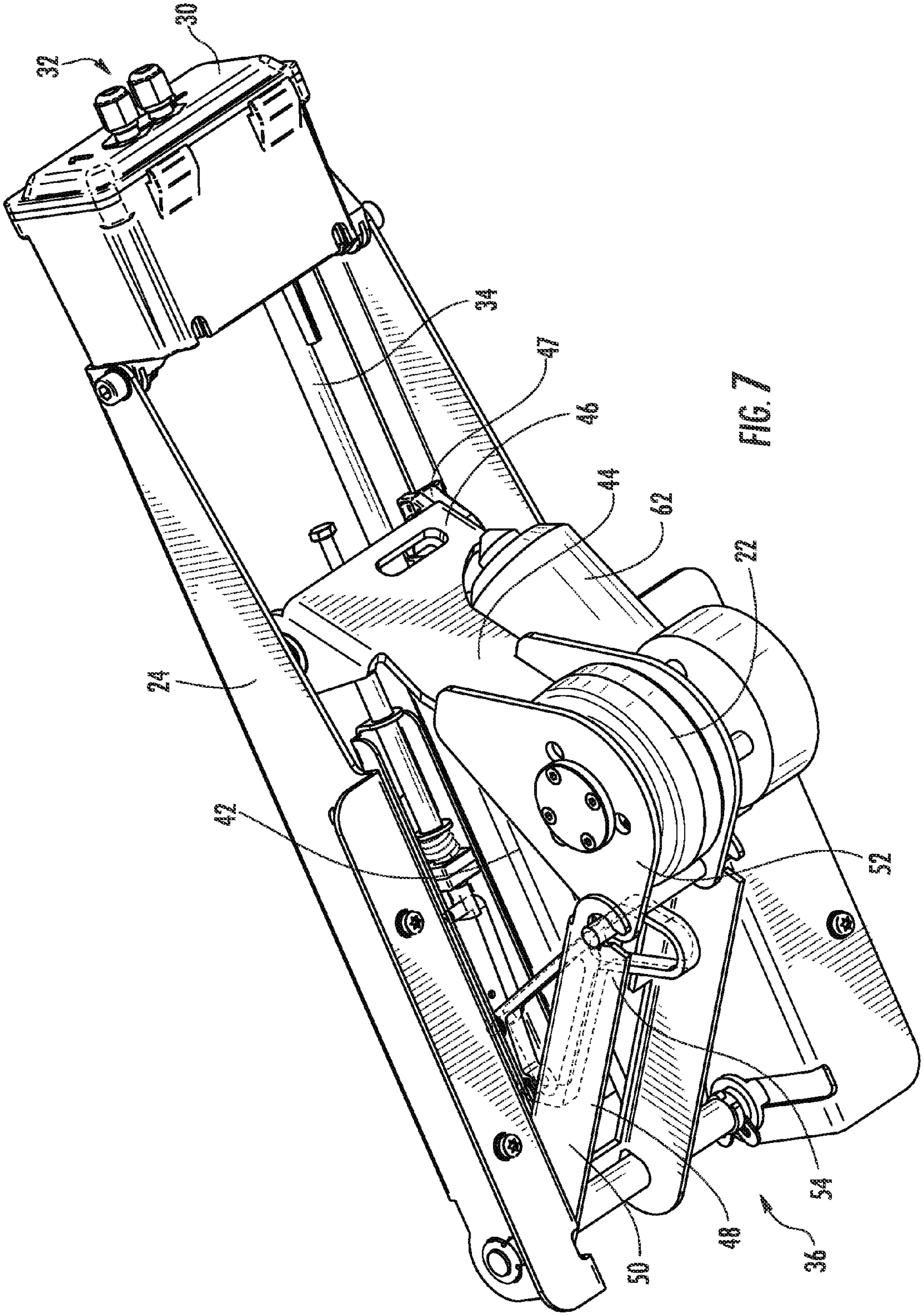
FIG. 7 is a bottom perspective view of an exemplary auxiliary wheel assembly with an electrically driven auxiliary wheel.
Figure 8:
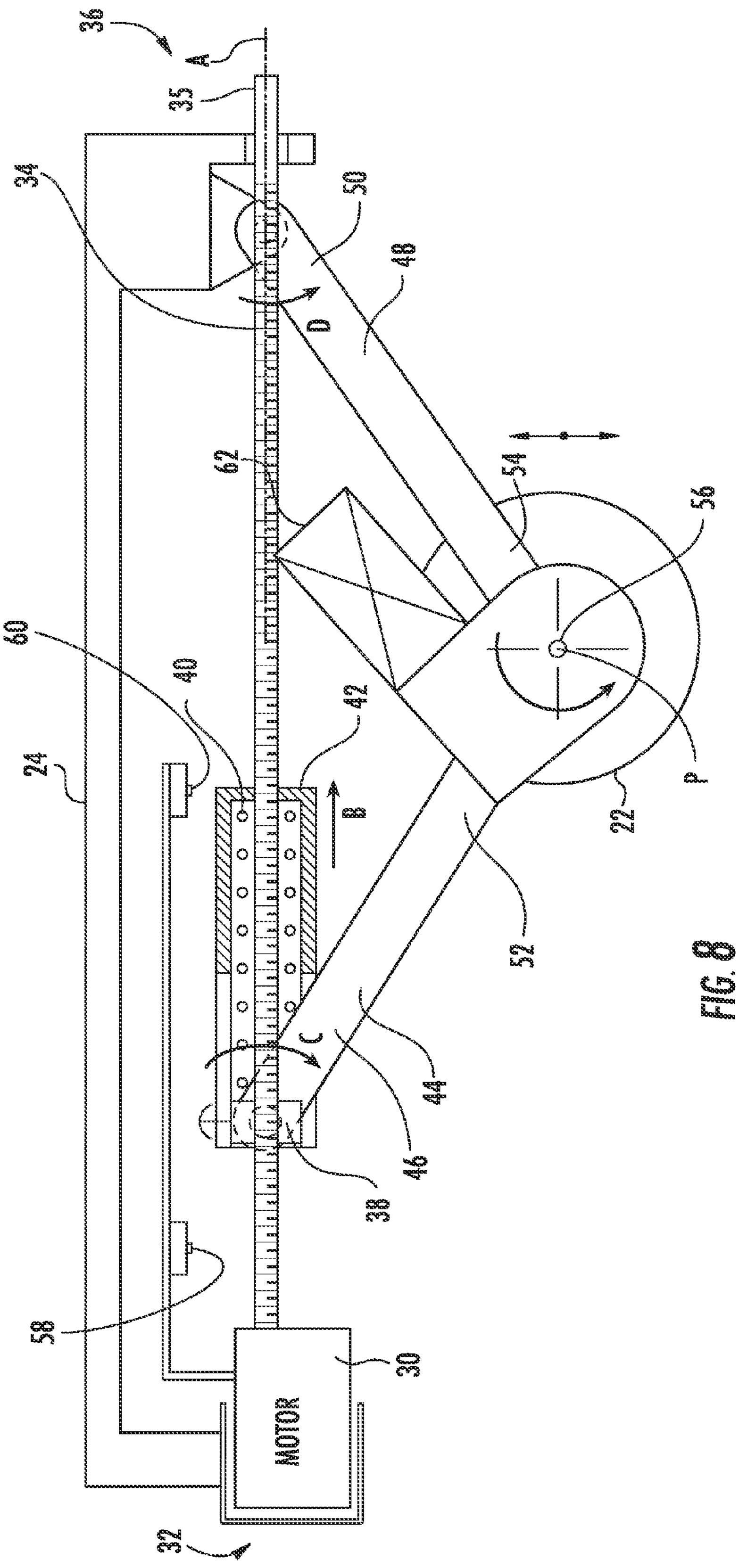
FIG. 8 is a diagrammatic representation of the exemplary auxiliary wheel assembly shown in FIG. 7.

The auxiliary wheel 22 may be manually driven (i.e., relies on force applied by the person steering the bed 10). Alternatively, the auxiliary wheel 22 may be electrically driven. The electrically driven auxiliary wheel 22 may include a drive motor 62 (which may be inclusive of a gearbox), as shown in FIGS. 7 and 8. The drive motor 62 may be supported in fixed relation to one of the brackets 44, 48 and have an output shaft (not shown) that drives the axle 56 of the auxiliary wheel 22.

Figure 9B:
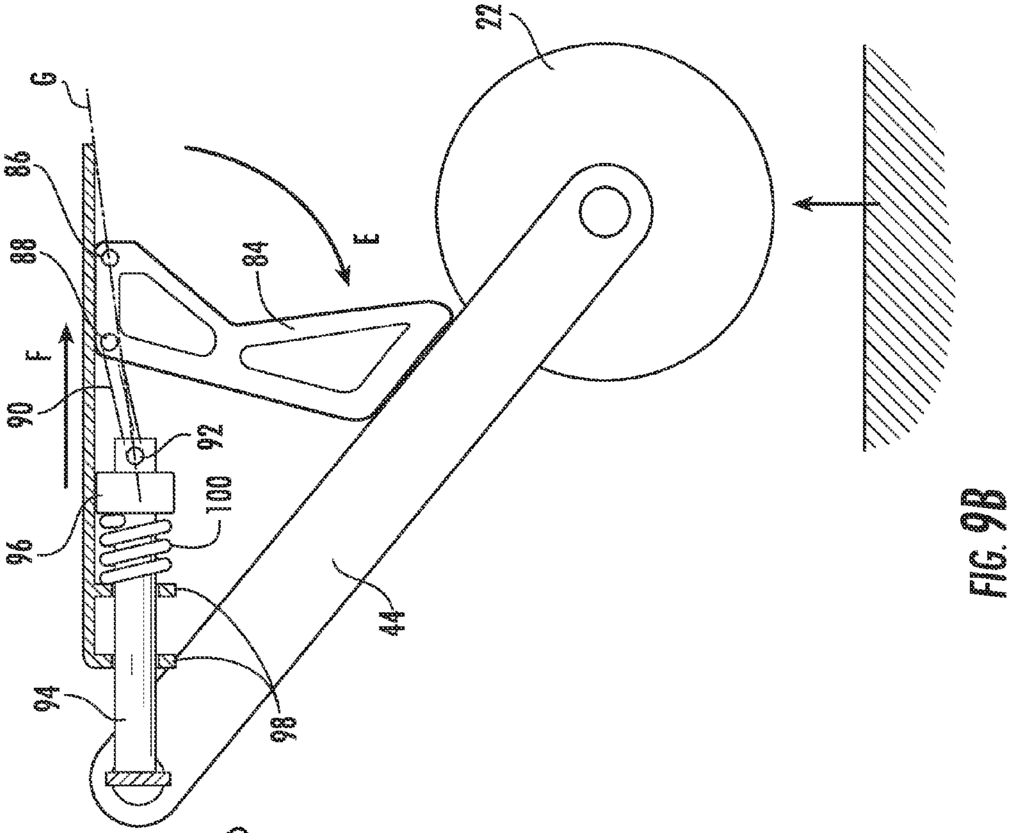
FIG. 9B is a diagrammatic representation of the exemplary auxiliary wheel assembly shown in FIG. 7, with a handle deployed to raise the auxiliary wheel out of contact with the supporting surface.
Figure 9A:
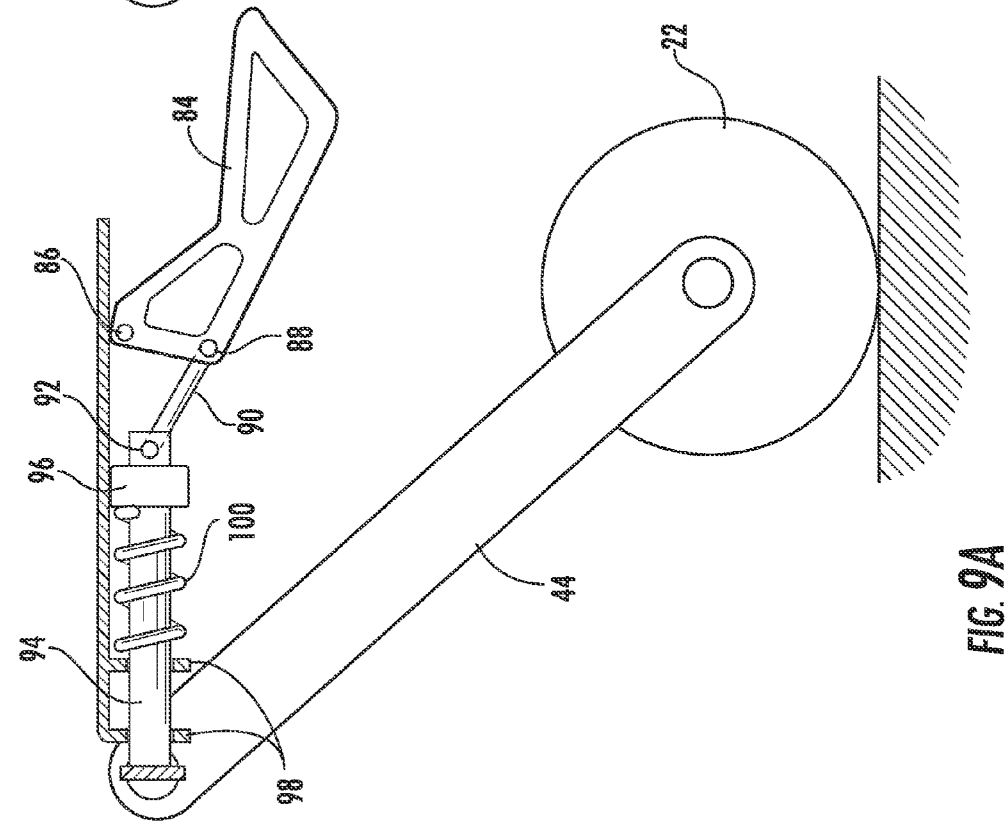
FIG. 9A is a diagrammatic representation of the exemplary auxiliary wheel assembly shown in FIG. 7, with a handle retracted to allow the auxiliary wheel to engage a supporting surface.

It should be appreciated that power to the auxiliary wheel assembly may be disconnected or become insufficient to retract or drive the drive motor 62. In such instance, the bed 10 may be difficult to move due to the friction or resistance of the drive motor 62. To allow the bed 10 to be moved with less exertion, the auxiliary wheel assembly may be provided with a manual control for manually raising and lowering the auxiliary wheel 22. Illustratively, the manual control including a handle 84, as shown in FIGS. 9A and 9B, that is supported for pivotal movement in relation to the girder 24 at pivot point 86. The handle 84 cantilevered portion of the handle 84 is pivotally connected at pivot point 88 to a connecting rod 90. The connecting rod 90 is pivotally connected at pivot point 92 to an elongated rod 94, which in the illustrated assembly is longitudinally and/or linearly displaceable. The elongated rod 94 is slidably supported in relation to the girder 24 by guides 98. A spring stop 96 is supported in fixed relation to the elongated rod 94. A biasing element (i.e., a helical spring 100) is carried by the elongated rod 94 between the spring stop 96 and a guide 98. The helical spring 100 urges the handle 84 to a deployed position, wherein the auxiliary wheel 22 is in contact with the supporting surface, as shown in FIG. 9A.

If the auxiliary wheel assembly is disconnected for power, or has insufficient power to retract or drive the drive motor 62, the auxiliary wheel 22 may be raised out of contact with the supporting surface. This can be accomplished by moving the handle 84 about the pivot point 86 in the direction of line E (i.e., counter clockwise when viewing FIG. 9B. This displaces the elongated rod 94 (i.e., to the left when viewing FIG. 9B) via displacement of the connecting rod 90 and the pivotal movement of the connecting rod 90 about pivot points 88, 92. Displacement of the connecting rod 90 urges the first bracket 44 (i.e., to the left when viewing FIG. 9B) to raise the auxiliary wheel 22 out of contact with the supporting surface. Throughout the same movement, the helical spring 100 is placed into compression. Continued movement of the handle 84 bout the pivot point 86 in the direction of line E raises the pivot point 88 between the handle 84 and the connecting rod 90 above the other two pivots 86, 92 (i.e., above the line G in FIG. 9B). The helical spring 100 biases the elongated rod 94 in the direction of line F (i.e. to the right when viewing FIG. 9B). The connecting rod 90 is biased upward into engagement with a fixed surface, to lock the manual control in place, and hold the auxiliary wheel 22 out of contact with the supporting surface, so that the bed 10 is easier to move, or can be moved with less exertion.

It should be appreciated that the manual control shown and described is an exemplary control and it components are shown and described for illustrative purposes. Other manual controls, including actuators other than the handle 84 shown and described, linkage arrangements other than the pivots 86, 88, 92 and rods 90, 44 shown and described, biased elements other than the helical spring 100 and spring arrangement shown and described, and locking arrangements, may be suitable for use with the auxiliary wheel assembly.

Figure 10:
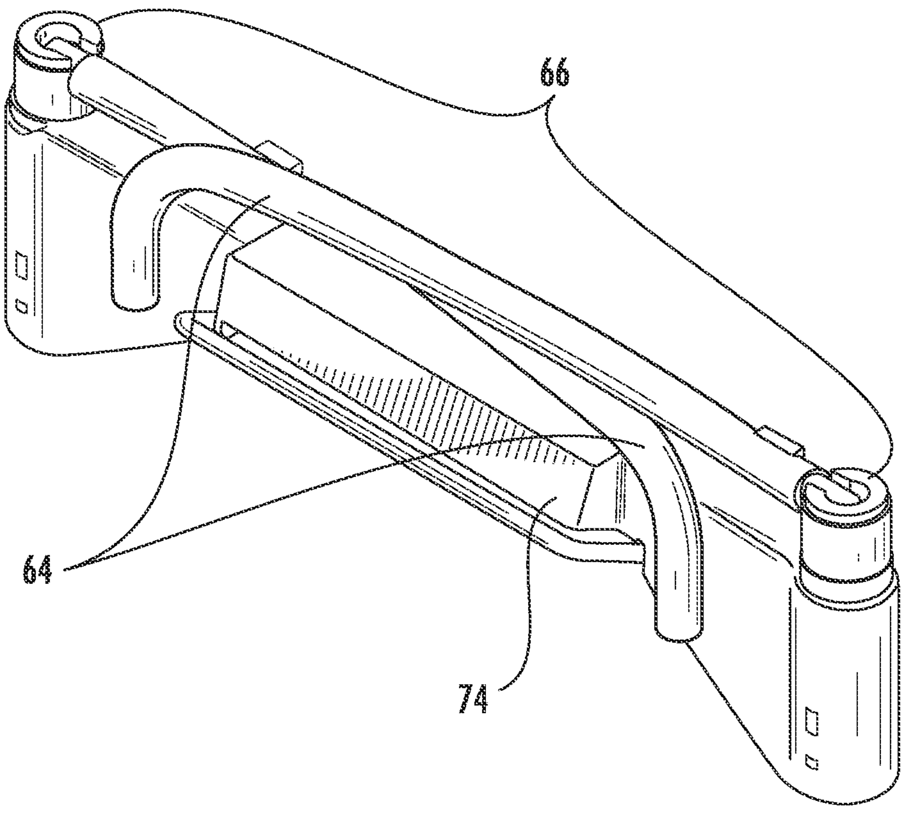
FIG. 10 is a perspective view of a portion of an end of the patient support apparatus provided with exemplary push handles and an exemplary control panel for controlling the operation of the electrically driven auxiliary wheel.
Figure 11A:
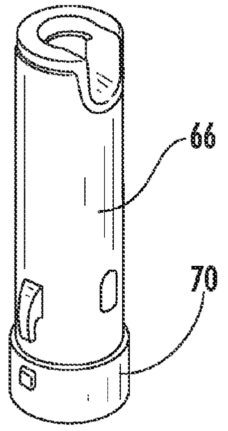
FIG. 11A is a perspective view of an exemplary push handle socket.
Figure 11B:
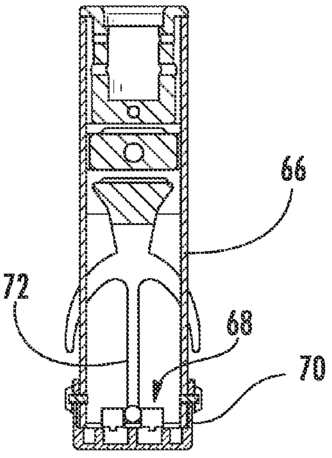
FIG. 11B is a cross-sectional view of the push handle socket shown in FIG. 11A.
Figure 11C:
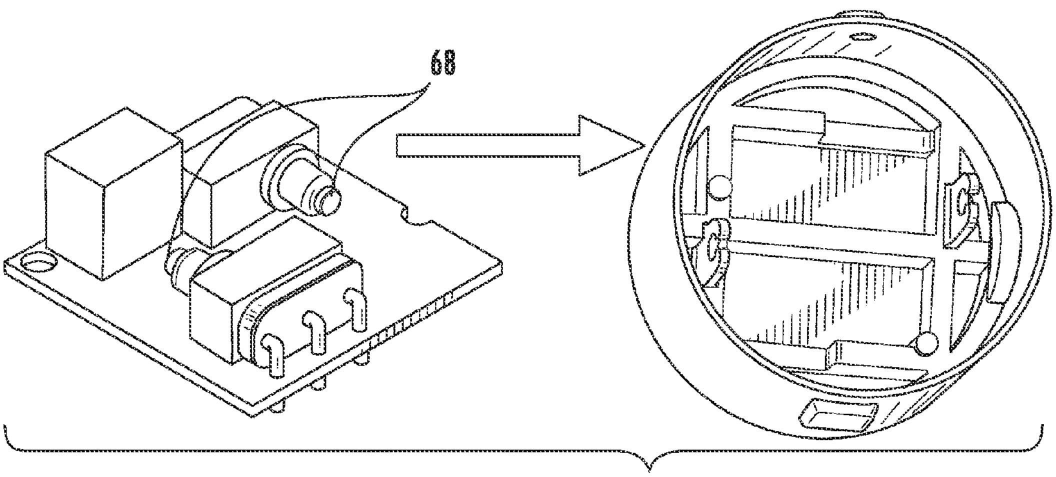
FIG. 11C is an exploded perspective view of an exemplary push handle bottom and an exemplary switch assembly.
Figure 11D:
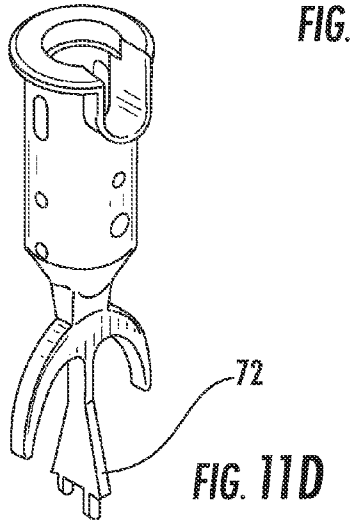
FIG. 11D is a perspective view of an exemplary paddle assembly for controlling the operation of the switch assembly shown in FIG. 11C.
Figure 12:
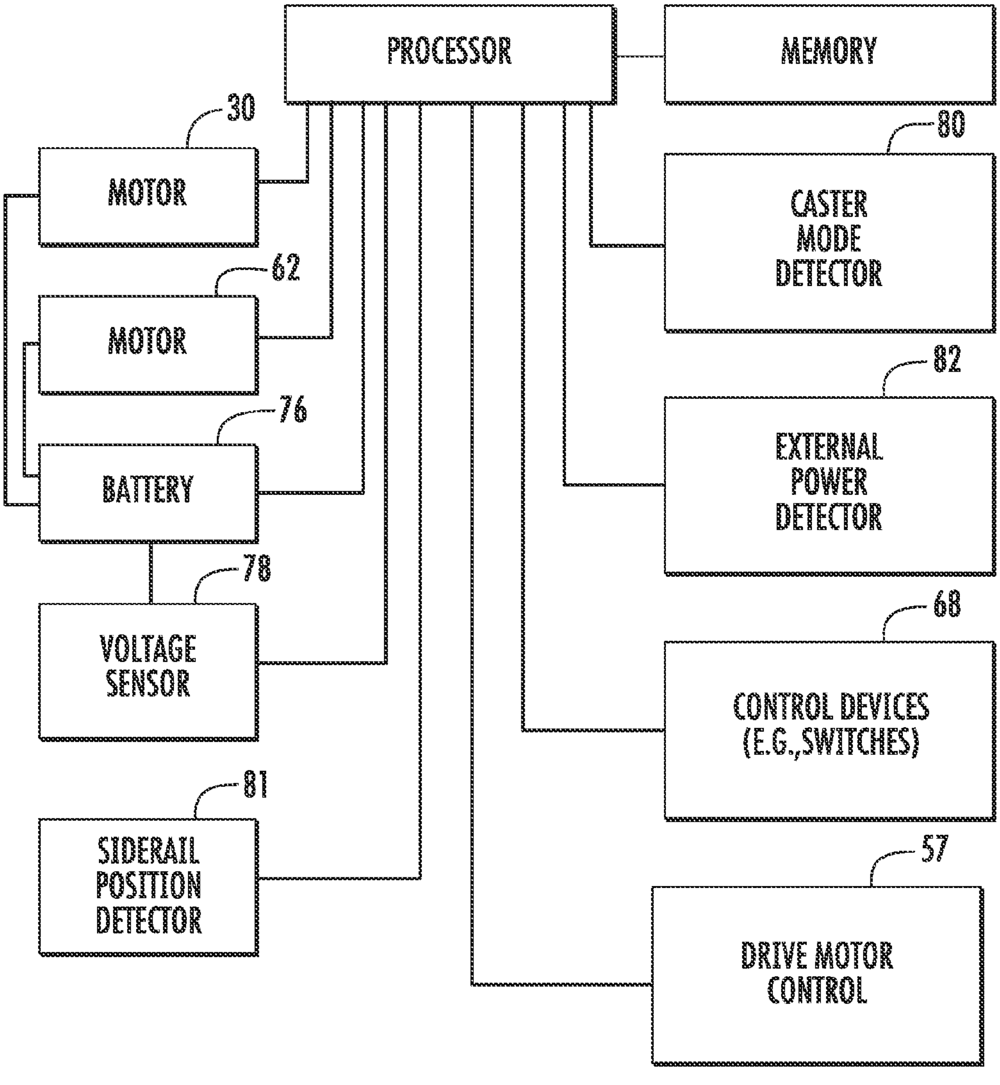
FIG. 12 is a general schematic showing basic exemplary components for controlling and/or affecting the control of the auxiliary wheel.

The drive motor 62 may be controlled in any suitable manner. For example, the drive motor 62 may be controlled by the operation of controls, such as push handles. Push handles 64 are shown in a lowered or stowed position in FIG. 10, supported at an end 26, 28 of the bed 10. Illustratively, the push handles 64 are pivotally movable between a raised deployed or operable position and a lowered stowed or inoperable position. In the raised position, the push handles 64 may be held upright in sockets 66. Although control devices (e.g., switches) may be located on the push handles 64 for access by the person moving the bed 10, the exemplary controls comprise one or more switches 68 (shown in FIG. 11C), which may be provided in the lower end 70 of the sockets 66, as shown in FIGS. 11A-11D. The push handles 64 may be pivotally moveable or toggled in forward and rearward directions, when pushing and pulling the bed 10.

For example, when pushing the bed 10, the push handles 64 may toggle forward. A paddle 72 (shown in FIG. 11D) supported at a lower end of a push handle 64 may engage a forward switch 68 (shown in FIG. 11C) to drive the auxiliary wheel 22 in a forward direction, thus propelling the bed 10 in a forward direction. The switch 68 may be in the form of a simple plunger switch. Conversely, when pulling the bed 10, the push handles 64 may be toggled rearward. When toggled rearward, the paddle 72 supported at the lower end of the push handle 64 may engage a rearward switch 68 to drive the auxiliary wheel 22 in a rearward direction. This propels the bed 10 in a rearward direction.

It should be appreciated that other forms of controls may be used to control the drive motor 62, for example, controls that measure force, direction and/or magnitude and translate such measurements into speed, direction and acceleration for controlling the operation of the auxiliary wheel 22.

A control panel 74 (shown in FIG. 10) may be located at the end of the bed 10 for controlling the operation of the drive motor 62 in response to control of the push handles 64 or other suitable control. The control panel 74 may include buttons (not shown) for activating the control panel 74, increasing the speed of the drive motor 62, and decreasing the speed of the drive motor 62. The control panel 74 may have indicators (not shown) that indicate the speed of the drive motor 62 and charge capacity of the battery supplying power to the drive motor 62.

It should be appreciated that deployment of the auxiliary wheel 22 and operation of the auxiliary wheel 22 may be prohibited unless one or more predetermined conditions are met. For example, if the bed battery 76 is insufficiently charged, as measured by a battery charge or voltage sensor or detector 78, deployment of the auxiliary wheel 22 may be prohibited. If the siderails 79 of the bed (shown in FIG. 1) are not in a raised position, as measured by a siderail position detector 81 (e.g., a two-way switch), deployment may be prohibited. If the caster devices 14 (shown in FIG. 1) supporting the base frame 12 in relation to the supporting surface are in a braked condition or position (i.e., the caster wheel do not rotate and/or swivel in relation to the base frame), as measured by a caster mode detector 80, deployment may be prohibited. If the external power source (e.g., A/C) is disconnected, as measured by an external power detector 82, deployment may be prohibited. When the bed 10 is connected to an external power source, the auxiliary wheel 22 permits normal (e.g., castered) movement of the bed 10.

It should further be appreciated that the auxiliary wheel 22 may also be retracted when predetermined conditions are met. For example, when the auxiliary wheel 22 is deployed and the battery 76 becomes insufficiently charged, as measured by a battery charge or voltage sensor 78, the auxiliary wheel 22 may raise to out of contact with the supporting surface.

It should be appreciated that the girder 20 is dimensioned and configured so as to substantially house the other components (e.g., motor 30, screw 34, drive nut 38, capsule 40, brackets 44, 48 and the auxiliary wheel 22) of the auxiliary wheel assembly within the girder 24 when the auxiliary wheel 22 is in the retracted position so that the auxiliary wheel 22 is substantially not visible beneath the base frame 12. Know auxiliary wheels, including those that are fixedly fastened to the base frame, or those that are manually or electrically retractable, are visible beneath the base frame 12. The auxiliary wheel assembly may fully raise the auxiliary wheel 22 so that it is covered or housed within the girder 24.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A patient support comprising:

a frame, a plurality of caster devices supporting the frame for movement in relation to a supporting surface, an auxiliary wheel, a lift supported in relation to the frame, the auxiliary wheel supported for movement in relation to the lift about an axis of rotation within an area bound by the caster devices, a shaft rotatable about an axis of rotation to drive the lift to move the auxiliary wheel in relation to the frame between a deployed position contacting the supporting surface and a retracted position spaced from the supporting surface, and a device configured to count one or more shaft rotations to control deployment and retraction of the auxiliary wheel by the lift, wherein the counting device is a Hall-Effect device and a permanent magnet is mounted in proximity to the Hall-Effect device on the shaft for rotation with the shaft.

2. A patient support comprising:

a frame, a plurality of caster devices supporting the frame for movement in relation to a supporting surface, an auxiliary wheel, a lift supported in relation to the frame, the auxiliary wheel supported for movement in relation to the lift about an axis of rotation within an area bound by the caster devices, a shaft rotatable about an axis of rotation to drive the lift to move the auxiliary wheel in relation to the frame between a deployed position contacting the supporting surface and a retracted position spaced from the supporting surface, a device configured to count one or more shaft rotations to control deployment and retraction of the auxiliary wheel by the lift, and a biasing element configured to provide a dampening effect when the auxiliary wheel encounters a raised surface of the supporting surface and urge the auxiliary wheel into contact with the supporting surface when the auxiliary wheel encounters a lowered surface of the supporting surface, wherein the shaft is a drive screw and the biasing element is helical spring carried by the drive screw and compressible by a drive nut threaded on the drive screw.

3. The patient support of claim 2, wherein the helical spring and the drive nut are captured within an enclosure supported for sliding movement in relation to the frame, the spring being compressible within the enclosure by the drive nut, the lift being supported for pivotal movement in relation to the enclosure and the frame.

4. A patient support comprising:

a frame, a plurality of caster devices supporting the frame for movement in relation to a supporting surface, an auxiliary wheel, a lift supported in relation to the frame and supporting the auxiliary wheel for movement about an axis of rotation within an area bound by the caster devices, an actuator configured to drive the lift to move the auxiliary wheel in relation to the frame between a deployed position contacting the supporting surface and a retracted position spaced from the supporting surface, a sensor arranged and configured to control deployment and retraction of the auxiliary wheel by the lift, and an element configured to provide a dampening effect when the auxiliary wheel encounters a raised surface of the supporting surface and urge the auxiliary wheel into contact with the supporting surface when the auxiliary wheel encounters a lowered surface of the supporting surface.

5. The patient support of claim 4, wherein the actuator comprises a shaft configured to rotate to drive the lift, and wherein the sensor is a Hall-Effect device and a permanent magnet is mounted on the shaft in proximity to the Hall-Effect device for rotation with the shaft.

6. The patient support of claim 4, wherein the actuator comprises a drive screw and the biasing element is a helical spring carried by the drive screw and compressible by a drive nut threaded on the drive screw.

7. The patient support of claim 6, wherein the helical spring and the drive nut are captured within an enclosure supported for sliding movement in relation to the frame, the spring being compressible within the enclosure by the drive nut, the lift being supported for pivotal movement in relation to the enclosure and the frame.

8. A patient support comprising:

a base frame, a plurality of caster devices supporting the base frame for movement in relation to a supporting surface, an auxiliary wheel, a lift having a first bracket pivotally supported for sliding movement in relation to the base frame and a second bracket pivotally supported in relation to the base frame, the first and second brackets supporting the auxiliary wheel for movement about an axis of rotation within an area bound by the caster devices, an actuator comprising a drive screw driven by a drive motor to rotate the screw about an axis of rotation to drive the first bracket to move the auxiliary wheel in relation to the frame between a deployed position contacting the supporting surface and a retracted position spaced from the supporting surface, a Hall-Effect device counting rotations of the drive screw to control deployment and retraction of the auxiliary wheel by the first bracket, and a helical spring carried by the drive screw and compressible by a drive nut and an enclosure to provide a dampening effect when the auxiliary wheel encounters a raised area of the supporting surface and urge the auxiliary wheel into contact with the supporting surface when the auxiliary wheel encounters a low area in the supporting surface.

* * * * *